United States Patent [19]
Perr et al.

[11] 4,062,230
[45] Dec. 13, 1977

[54] FUEL MILEAGE INDICATOR

[75] Inventors: Julius P. Perr; Peter W. Schutz; Patrick R. Badgley; Edgars Valdmanis, all of Columbus, Ind.

[73] Assignee: Cummins Engine Company, Inc., Columbus, Ind.

[21] Appl. No.: 717,775

[22] Filed: Aug. 25, 1976

[51] Int. Cl.² ............................................. G01F 9/02
[52] U.S. Cl. .................................................. 73/114
[58] Field of Search .............................. 73/114, 119 A

[56] References Cited
U.S. PATENT DOCUMENTS

| | | | |
|---|---|---|---|
| 1,533,530 | 4/1925 | Wheatley et al. | 73/114 |
| 3,014,366 | 12/1961 | Faunce | 73/114 |

Primary Examiner—Jerry W. Myracle
Attorney, Agent, or Firm—Gary M. Gron; Robert T. Ruff

[57] ABSTRACT

The disclosure illustrates a fuel mileage indicator which gives a dynamic reading of the fuel mileage for a vehicle powered by an internal combustion engine. As a result it indicates to the driver whether he is driving efficiently and is conserving fuel. The device consists of a variable resistance device responsive to a fuel system parameter or other engine parameter which is proportional to engine fuel flow. This variable resistance device is connected in series with a generator having a D.C. voltage output directly proportional to vehicle speed. An ammeter indicates current through the circuit and is calibrated to give an output of miles per gallon.

7 Claims, 2 Drawing Figures

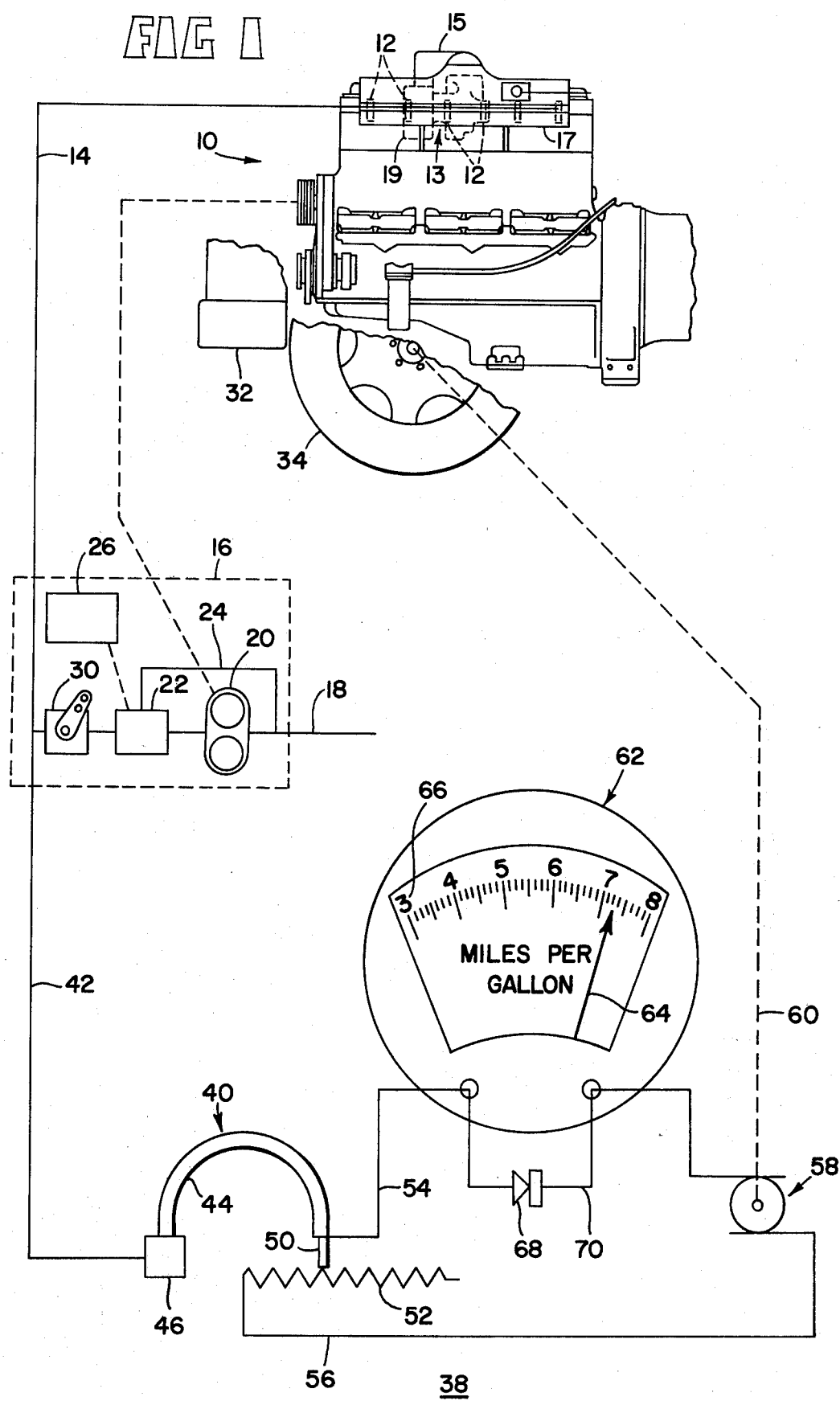

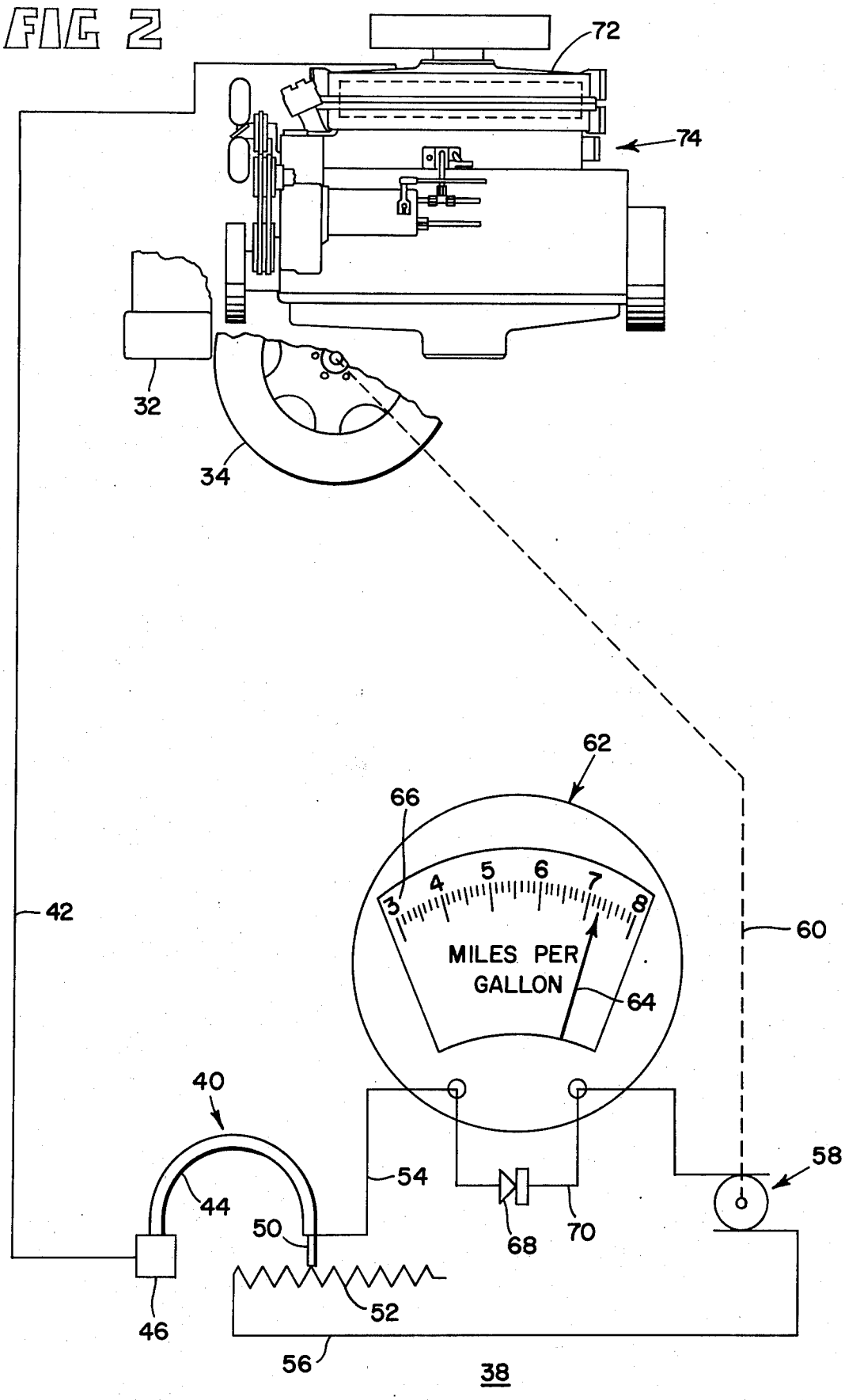

FUEL MILEAGE INDICATOR

It has been a common objective of heavy duty truck operators to provide a dynamic indication of fuel mileage while a truck is in operation. Such an indication gives an operator of the truck the opportunity to quantatively determine whether he is operating the vehicle efficiently or inefficiently in terms of fuel consumption. While such devices have been made available in the past, they are either inaccurate or highly complex. This complexity means that the device is quite expensive and therefore deters its application to large numbers of trucks.

To overcome the above problems it is proposed to incorporate a simplified fuel mileage meter in a vehicle powered by an internal combustion engine which has an operating parameter whose magnitude is substantially proportional to fuel flow. The meter consists of means responsive to the engine operating parameter for producing a first signal and a means responsive to the vehicle speed for producing a second signal. The second signal is divided by the first signal and the resultant is indicated by a device in terms of distance traveled per fuel consumed.

The above and other related features of the present invention will be apparent from a reading of the following description of the disclosure shown in the accompanying drawings and the novelty thereof pointed out in the appended claims.

FIG. 1 shows the fuel mileage meter embodying the present invention along with a compression ignition internal combustion engine and vehicle powered thereby which utilizes the fuel mileage meter.

FIG. 2 illustrates the fuel mileage meter of FIG. 1 applied to another type of internal combustion engine.

FIG. 1 shows a compression ignition engine 10 with which the present invention may be used. Since its principles of operation are well known, the complete details in engine 10 will not be covered to simplify the discussion of the present invention. For the present discussion it is enough to say engine 10 relies on the heat of compression of air to ignite fuel that is injected in timed sequence by fuel injectors 12, Injectors 12 are of the direct injection type in which a cam actuated plunger injects fuel at high pressure into the engine cylinders (not shown) for combustion.

Engine 10 is used to power a vehicle 32 only a portion of which is shown. The vehicle 32 includes one or more wheels 34 which support the vehicle 32 for movement along the ground through the use of a transmission 36 which couples engine 10 to suitable drive wheels.

The exhaust gases from the engine pass across the turbine of a turbocharger 13 which drives its compressor 19 to pressurize air for delivery through duct 15 to intake manifold 17. Injectors 12 receive fuel from a fuel system 16 via a distribution conduit 14. Fuel system 16 receives fuel from a supply line 18 and pressurizes it for delivery to conduit 14. The fuel pressure to injectors 12 is controlled in accordance with the pressure-time relationships set forth in U.S. Pat. Nos. 2,727,503 and 2,749,897 to achieve a proper quantity of injected fuel to meet engine operating requirements. Briefly each injector has a metering orifice between conduit 14 and a metering chamber within the injector. a cam actuated reciprocating plunger injects fuel through nozzles into the combustion chamber at or near top dead center in the engine cycle. The quantity of fuel injected is directly related to the pressure differential across the orifice.

The engine fuel system 16 includes a gear type engine driven pump 20 (note the mechanical connection) having its low pressure side connected to a supply line 18 and feeding a governor controlled bypass valve 22. Valve 22 bypasses fuel from the high pressure side of pump 20 to the fuel supply line 18 through a passage 24. Operation of valve 22 is controlled by a mechanical governor 26 responsive to engine rpm to produce an output fuel flow having a given schedule of pressure vs. engine rpm. From that point, fuel passes to an operator controlled throttle valve 30 which regulates flow to line 14 in response to operator demand.

In the above system, fuel that does not enter the injector metering chamber is returned to a fuel tank. There are three significant properties of this return flow: (1) Its volume is substantial in relation to the fuel burned by the engine (2) Its temperature is elevated compared to inlet fuel temperature and (3) It is significantly areated. These three properties of the return flow make conventional fuel rate measuring devices impractical.

We have discovered that there exists a substantially proportional relationship between fuel flow to the engine and the pressure in conduit 14. This relationship exists over substantially all of the engine operating range. This relationship is utilized by a fuel mileage meter 38 to give an indication of fuel mileage for the vehicle powered by the engine.

Fuel mileage meter 38 comprises a pressure responsive variable resistance device 40 which may take many forms. In any form it is responsive to fuel pressure to injectors 12, reflected through a signal conduit 42. As illustrated variable resistance 40 takes the form of a bourdon tube 44 fixed at 46 where the interior of the tube is connected to conduit 42. Bourdon tube 44 has a free end 48 which supports a wiper 50 movable across a resistance device 52 in the form of many turns of high resistance wire. Increasing pressure tends to straighten out tube 44 and move wiper 50 across wire 52. Resistance, as reflected in line 54 connected to wiper 48 and line 56 connected to wire 52, increases with increasing pressure in conduit 42. Lines 54 and 56 extend to a voltage generating device 58 in a series connection.

Voltage generating device 58 may take many forms but is shown as a DC generator driven in a predetermined ratio to the ground speed of the vehicle 32 by a mechanical connection 60 to the ground wheel 34. Depending upon the particular vehicle, generator 58 may be driven from a speedometer connection which is usually found on transmission 36. Generally 58 may also be in the form of a three phase AC generator having its output rectified to produce a DC voltage directly proportional to vehicle ground speed.

To measure the current between resistance device 40 and generator 58 an ammeter 62 is interposed in line 54. Ammeter 62 has a pointer 64 indicating current flow but has a scale 66 calibrated in distance per volume of fuel consumed. In order to protect the ammeter from excessive current flow under certain conditions a diode 68 is provided in line 70 which is connected in parallel with ammeter 62. The diode 68 is arranged so that it opposes the normal flow of current in the system and prevents current flow through line 70. However, its breakdown voltage is selected so that during certain conditions when there is a substantial voltage drop across it, it will permit parallel current flow through line 70 and thus protect ammeter 62.

The relationship between the various components of the fuel mileage meter may be set forth as follows:

$$R_{40} = K_1 f(P_{42})$$

$$V_{58} = K_2 f(v_{32})$$

$$I_{62} = K_3 f(i_{54})$$

Thus it is seen that resistance of device 40 ($R_{40}$) is equal to a constant times a function of the pressure in line 42 ($P_{42}$). As stated before fuel flow is directly proportional to the pressure reflected in line 42 so that pressure of $P_{42}$ may be replaced by fuel flow ($ff$). The voltage of device 58 is a constant times a function of the velocity of vehicle 32 ($v_{32}$). DC generator 58 produces an output voltage which is substantially proportional to its rpm and this may be related through simple ratios to the speed of vehicle 32. The current reflected by meter 62 is a constant $K_3$ times some function of current through line 54. Using Ohm's Law the equations may be combined as follows:

$$I_{62} = V_{58}/R_{40},$$

or $$K_3 f(i_{54}) = [K_2 f(v_{32})]/[K_3 f(ff)],$$

combining constants into a signal constant $$i_{54} = [K f(V_{32})]/[f(ff)]$$

If we substitute units for the figures the equation is as follows:

$$i_{54} = K f[(\text{Miles/hour})/(\text{Gallons/hour})],$$

which gives $$i_{54} = K \text{ Miles/gallon}$$

Thus we see that the current in line 5 is directly proportional to the miles per gallon of the vehicle 32. Looking at this equation we see that the resistance goes down as fuel consumption goes down and the voltage goes up with vehicle speed.

Under certain conditions, for example when the vehicle 32 is coasting down a hill, fuel flow is at an idle level and therefore resistance is at a minimum. At the same time, however, voltage is extremely high since the vehicle velocity is generally undiminished. This produces a substantial current through line 54 which could damage meter 62 but for the use of diode 68. Under this condition the diode 68 breaks down and permits current flow in parallel which greatly reduces the current flow through the meter 62 to protect it.

The above components utilize Ohm's Law in the determination of fuel mileage and with current reflecting the dependent variable of mileage. It should be noted however, that the equation may be solved in different forms either sensing voltage or resistance as the dependent variable.

Referring to FIG. 2 the meter 40 may be utilized on an engine other than a compression ignition engine. In this case the line 42 extends to the intake manifold 72 of a spark ignition engine 74. For engine operation in the higher power regions, generally experienced during heavy duty truck operation, the manifold pressure (or manifold vacuum) is substantially proportional to fuel flow. Thus the pressure in line 40 as reflected in the bourdon tube 44 varies resistance for device 40 in direct proportion to fuel flow. The meter 38 may then be used for carbureted engines to give a dynamic indication of full mileage as described above.

The above meter has extremely simplified components and relies on fundamental engine operating parameters to generate an easily derived but accurate signal reflecting fuel flow. The device is substantially less expensive than existing devices and provides a dynamic indication to a driver of his fuel consumption.

While a preferred embodiment of the present invention has been described it should be apparent that it may be presented in alternative forms by those skilled in the art without departing from its spirit and scope.

We claim:

1. An apparatus for indicating fuel mileage in terms of the ratio between distance traveled and engine fuel consumption for a vehicle powered by an engine of the compression ignition type having unit fuel injectors and a fuel delivery system producing a fuel pressure substantially proportional to fuel flow, said vehicle having ground drive wheels, said apparatus comprising:
   means for generating a first signal substantially proportional to the fuel pressure of said fuel system;
   means for generating a second signal substantially proportional to the velocity of said vehicle;
   means for dividing said second signal by said first signal; and
   means connected to said dividing means for indicating fuel mileage.

2. Apparatus as in claim 1 wherein the signals generated by said signal generating means are electrical and the signals are divided using Ohm's Law.

3. Apparatus as in claim 1 wherein:
   said first signal generating means comprises a variable resistor whose resistance varies in proportion to the fuel pressure;
   said second signal generating means comprises a generator producing a voltage directly proportional to vehicle speed, said generator being coupled through a fixed ratio to the rotating ground drive wheels of said vehicle;
   said resistor and said generator being series connected thereby defining said dividing means, and
   said indicating means comprises an ammeter indicating the current flow through said resistor and said generator.

4. Apparatus as in claim 3 further comprising a device connected in parallel with said ammeter, said device normally preventing current flow therethrough but having a given breakdown voltage reflecting high current flow through said ammeter for passing current around said ammeter thereby protecting it.

5. In combination:
   a compression ignition engine having a fuel system comprising unit fuel injectors injecting fuel into individual cylinders and a fuel delivery system having variable pressure, said pressure being substantially proportional to the fuel consumption of said engine, said engine powering a vehicle having at least one ground drive wheel,
   means for generating a first signal substantially proportional to said fuel delivery system fuel pressure;
   means for generating a second signal substantially proportional to the velocity of the vehicle powered by said engine;

means for dividing said second signal by said first signal, and means connected to said dividing means for indicating fuel mileage.

6. Apparatus as in claim 5 wherein:

said first signal generating means comprises a variable resistor whose resistance varies in direct proportion to the fuel system pressure;

said second signal generating means comprises a generator producing a DC voltage directly proportional to vehicle speed, said generator being coupled through a fixed ratio to at least one of the rotating ground drive wheels of said vehicle, said resistor and said generator being series connected thereby defining said dividing means, and said indicating means comprises an ammeter indicating the current flow through said resistor and said generator.

7. Apparatus as in claim 6 further comprising a device connected in parallel with said ammeter, said device normally preventing current flow therethrough but having a given breakdown voltage reflecting high current flow through said ammeter for passing current flow around said ammeter and thereby protecting it.

* * * * *